United States Patent [19]

Schaeff

[11] 4,176,726

[45] Dec. 4, 1979

[54] AMPHIBIOUS VEHICLE

[75] Inventor: Hans Schaeff, Langenburg, Fed. Rep. of Germany

[73] Assignee: HFM Hohenloher Fahrzeuge- und Maschinenvertrieb GmbH, Langenburg, Fed. Rep. of Germany

[21] Appl. No.: 913,237

[22] Filed: Jun. 6, 1978

Related U.S. Application Data

[63] Continuation of Ser. No. 790,040, Apr. 22, 1977, abandoned.

[30] Foreign Application Priority Data

Apr. 23, 1976 [DE] Fed. Rep. of Germany ....... 2617834

[51] Int. Cl.² ........................................... B60B 15/00
[52] U.S. Cl. ..................... 180/15; 115/1 R; 180/24.02
[58] Field of Search .............. 115/1 R, 1 A, 49; 180/1 H, 6.2, 15, 24.02, 6.48, 22, 24.08

[56] References Cited

U.S. PATENT DOCUMENTS

| 3,306,250 | 2/1967 | Pitchford | 115/1 R |
| 3,698,499 | 10/1972 | Albertson | 180/6.2 |

*Primary Examiner*—Charles E. Frankfort
*Attorney, Agent, or Firm*—Shlesinger, Arkwright, Garvey & Dinsmore

[57] ABSTRACT

An amphibious vehicle including an undercarriage having pairs of front and rear primary wheels, a vehicle body mounted on the undercarriage, a propulsion device operable while the vehicle is afloat and including drive wheel means mounted on arms pivotally secured to the rear of the vehicle so that the height of the drive wheel means may be adjusted by pivoting the arms about a horizontal axis, the drive wheel means having a ribbed pattern thereon.

10 Claims, 6 Drawing Figures

AMPHIBIOUS VEHICLE

This is a continuation, of application Ser. No. 790,040, filed Apr. 22, 1977, now abandoned.

The invention is relative to a land vehicle with floating motive power, i.e. an amphibious vehicle, consisting of an undercarriage with a watertight floor shell and at least one forward pair and one rear pair of bottom wheels, preferably powered, a passenger or freight carrier mounted on the under-carriage, and a propulsion device which is operable while the vehicle is afloat.

In known amphibian vehicles of this type, a drive shaft is provided, leading from the motor to the rear of the vehicle, and can be made watertight by the floor shell on which is mounted a propeller as a ship's screw, which can be powered by the motor while the vehicle is afloat. This propeller propulsion, however is only capable of working in the water and is rapidly unusable when it comes in contact with tangled seaweed, reeds or other material, which wraps around the drive shaft; such plants often grow on the water's edges and the slopes of river banks and must be traversed during cross country driving. Such propellers are completely unsuitable for propulsion in mire or bog.

Therefore, the cross country capability of known amphibian vehicles in the area of the slopes of riverbanks of rivers and seas is for the most part not guaranteed, because the rear of the vehicle is still afloat when the float wheels are already in contact with the solid ground. In very boggish ground, a front wheel drive of the amphibian vehicle is not in position to move the vehicle forward onto the bank, if, on account of the floating condition of the rear half of the vehicle, the necessary ground pressure is still not provided for the front wheels and also for the same reason the front wheels still cannot find any hold, or grind away and slope of the bank.

BACKGROUND AND OBJECTS

The object of the invention is a land vehicle with floating motive power to improve the vehicle of traditional structural type wherein an effective propulsion is available while the vehicle is afloat and a very steep or non-uniform river bank slope can be surmounted without difficulty. It can also pass through the border area between solid ground and water, i.e. mire or bog.

This problem is solved according to the invention in that the propulsion device has a drive wheel with longitudinal ribs, driven to revolve around a horizontal axis, which drive wheel, with the aid of pivot arms at the rear of the vehicle, is height adjustable between a lower position pressed against the ground and an upper position partially immersed in the water.

A drive wheel profiled with longitudinal ribs operates in the sense of a paddle when it is upwardly pivoted state during water travel, whereby a powerful optimum propulsion effect is guaranteed by the adjustable immersion depth, by which only the bottom part of the drive wheel shoves the water away, and it is mounted over essentially the entire breadth of the vehicle, somewhat as a sort of paddle steamer with rear drive. The capacity to cross mire and/or slopes of riverbanks is obtained with this construction such that the drive wheel is pressed downward against the earth with the aid of its pivot arms upon approach to the bank, so that in proportion to the size of the angle of the slope, the drive wheel comes in contact with the ground either first of all or else simultaneously with the front wheels of the vehicle, and in either case an effective support and distribution of the ground support pressure of the vehicle is guaranteed. During movement in mire, the drive wheel which is effective preferably over the breadth of the vehicle serves simultaneously as support and propulsin device.

In a preferred embodiment of the invention, the drive wheel which extends essentially over the entire breadth of the vehicle is longitudinally apportioned, and each wheel half is controllable independently with reference to its speed of rotation and its direction of rotation. The apportioned arrangement of the drive wheel simplifies mounting and maintenance and aids in swinging around and making turns in water. Otherwise, the swinging around in the water can be effected by steering the front wheels.

If the wheel halves are mounted on pivot arms independently from each other or if both of the wheel sections are mounted on one common transverse axle, the vehicle can be easily adapted to the ground irregularities, e.g. by oblique movement along the slope of the bank, so that the vehicle is supported at any moment by the biased pivot arms with the wheel sections being pressed against the ground independent from each other. The wheel arms and drive wheel sections being independent from each other also guarantees a greater maneuverability during flotation.

Besides the application for support of a vehicle during travel on slopes of riverbanks or during balancing on an irregular bottom, the described structure is also basically sound for motor vehicles which use a chain or caterpillar drive with the aid of the drive wheel arrangement and are used for overland travel in mountains during snow and ice, or to produce a propulsion for boggy ground during an almost floating condition, whereby the range of the effect of the selected apportioned drive wheel can be regulated as desired and according to necessity.

Practically, the pivot arms are height adjustable in the rear area of the undercarriage with hydraulic cylinders supported on the undercarriage. The pressure of the drive wheel against the ground can be adjustable with the aid of mechanical or pneumatic spring devices operating on the pivot arms. In this sense, during overland travel of the vehicle, in case of an overrun or spinning of the front wheels, the drive wheels can be connected, so that then a four-wheel drive is available.

In one further proposal of the invention, the drive wheel or wheel sections can be embodied also as drive wheel pairs, on the undercarriage, and if desired with hydrostatic power. By use of hydrostatic power, the motor can be mounted in the best position for land travel and for water travel, e.g. mounted in the front, the midsection, or the rear, according to which structure and which application for the vehicle come most into question.

In a special embodiment of the invention, additional transverse circumferential ribs are arranged on the drive wheel or drive wheel sections, which ribs essentially increase the propulsion effect of the longitudinal ribs while the vehicle is afloat. Thereby the drive wheel body is preferably a hollow body of steel or plastic.

In a preferred embodiment, the drive wheel is embodied in several individually detachably mounted wheel sections, which preferably are embodied as rubber or plastic tires with a strongly defined rib profile, especially a herringbone rib profile. In the top rest position, these wheel sections can project over the rear vehicle end, whereby they work as stabilizer.

DESCRIPTION OF THE DRAWINGS

The invention is more clearly described in the following relative to the embodiment shown in the drawings.

DESCRIPTION OF THE INVENTION

Figure 1:
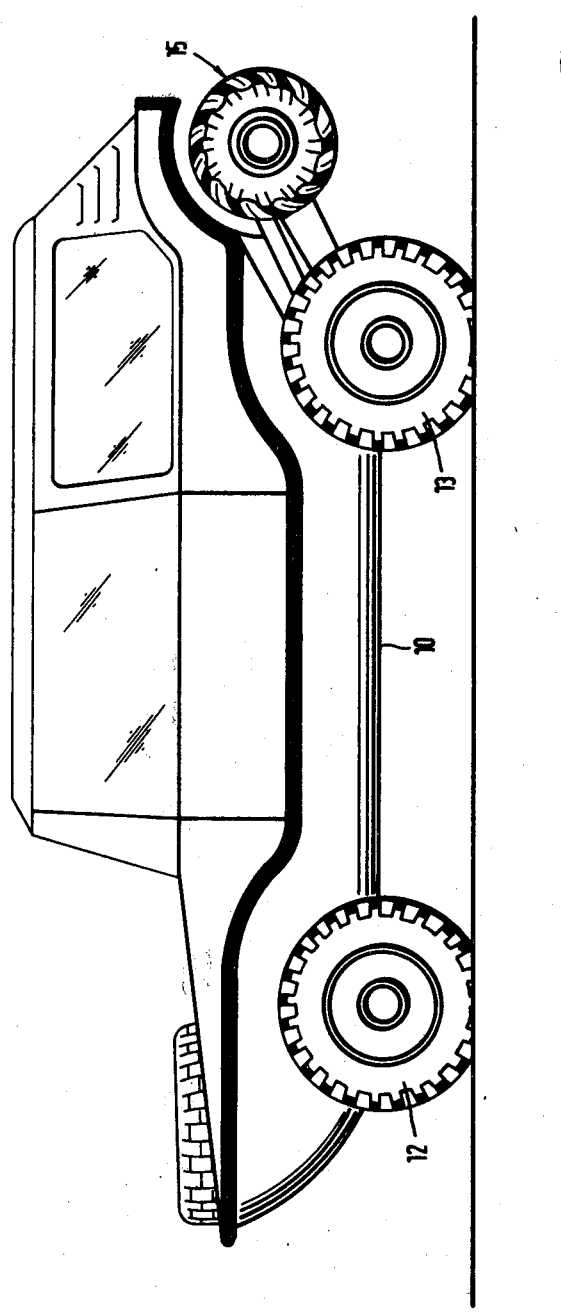
FIG. 1 is a side view of the vehicle of the invention as for land travel.

A rapid overland travel and floating power vehicle according to the invention as shown in the drawings has an undercarriage or vehicle frame with bottom wheels on a watertight flooring shell. On shell 10 are mounted front bottom wheels 12 and rear bottom wheels 13, on a suspension which is not shown, for example with the aid of guide rods 11 (FIG. 6) on both sides, wherein preferably the front wheel pair 12 is driven. The power motor arranged in the desired position within the watertight vehicle frame 10 operates on the front wheels in a suitable manner through hydrostatic controls (not shown), so that no movable lines need to be provided except for hydraulic lines.

Figure 5:
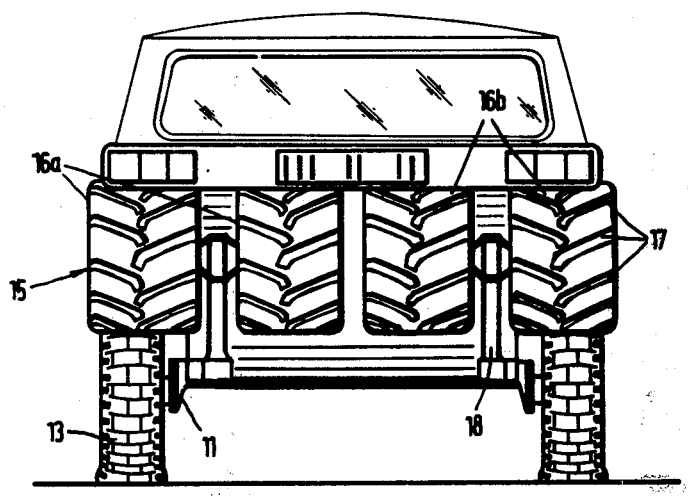
FIG. 5 is a rear view of the vehicle as in FIG. 1.
Figure 6:
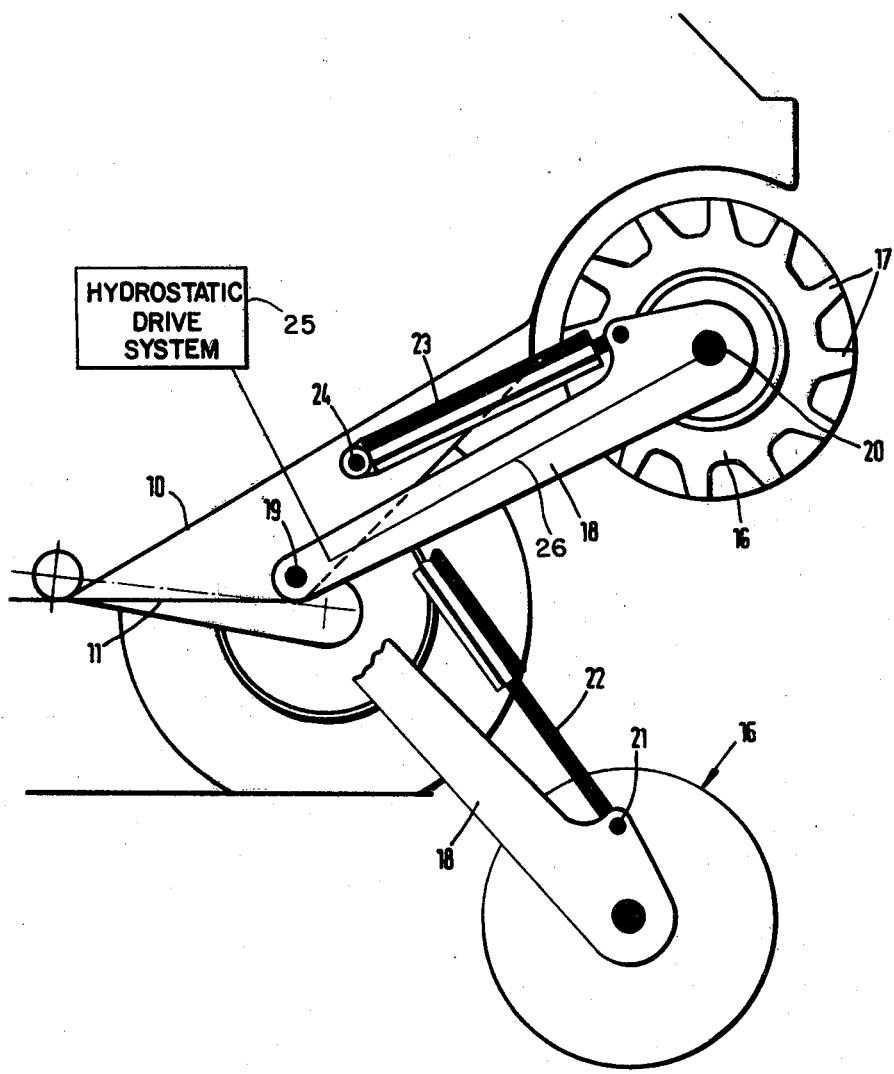
FIG. 6 is an enlargement of a diagrammatic representation of the pivot arm with drive wheel sections as attached to the rear of the vehicle.

At the rear of the vehicle is a drive wheel 15, for example extending across the entire vehicle breadth, which in the embodiment in FIG. 5 is apportioned into four wheel sections 16, whereby the wheel sections consist e.g. of inflatable rubber tires, which have a strongly defined rib profile 17, preferably in a herringbone pattern. The drive wheel is in the position shown in FIGS. 1 and 2 similar to a paddlewheel of a boat, with passenger section covered at the front and partially on the top. The height of the profile of ribs 17 is high, as shown in FIG. 6, so that the drive wheels can provide an effective propulsion while the vehicle is afloat or in snow or bog. Furthermore, the longitudinal rib as shown in a side view of the drive wheel in FIG. 6 can easily be inclined forward, or the front side of the ribs runs essentially radially or in plane parallel thereto.

Instead of the individual inflatable tires of rubber or soft plastic (for good adherence in ice and snow), the invention can also be realized with other types of drive wheels, e.g. with hollow cylinders of steel or plastic with ribs attached thereon, which provide similarly good results when the vehicle is afloat as in overland travel. The propulsion during water travel is improved if the work of the longitudinal ribs is apportioned in predetermined longitudinal sections, and if for this purpose circumferential ribs or radial ridges are provided on a continuous drive wheel or on drive wheel sections.

The drive wheel 15 can be mounted with the aid of pivot arms 18, which are held by articulation to undercarriage 10 by means of pins 19. In the embodiment shown in FIGS. 5 and 6, two independent pivot arms 18 are articulated on undercarriage 10, whereby each pivot arm supports a transverse axle 20, on which are rotatably mounted the two drive wheel sections 16. The piston rod 22 of a hydraulic cylinder 23 engages with each pivot arm 18 by means of a hinge pin 21, and the pivot eye is mounted to pivot on a pivot pin 24 on undercarriage 10. FIG. 6 shows pivot arm 18 in top end position with the drive wheel mounted thereon with compressed hydraulic cylinders 22, 23, which also corresponds to rest position in FIG. 1. FIG. 6 also shows the second pivot arm 18 in a bottom lowered position, which is obtained with hydraulic cylinders 22, 23, extended and corresponds to the drive position shown in FIG. 3.

Figure 3:
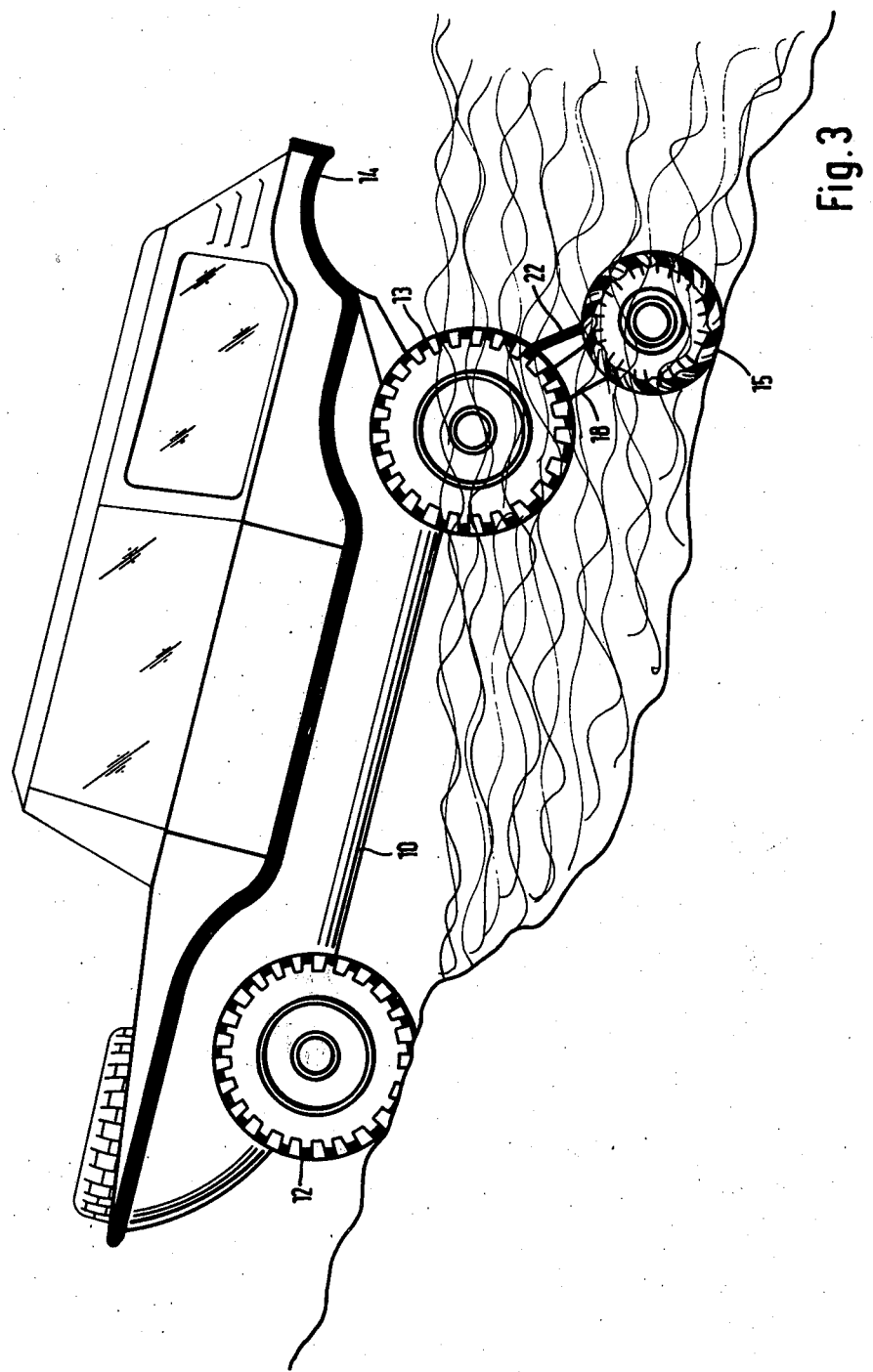
FIG. 3 is the vehicle during travel up a slope of a riverbank.
Figure 4:
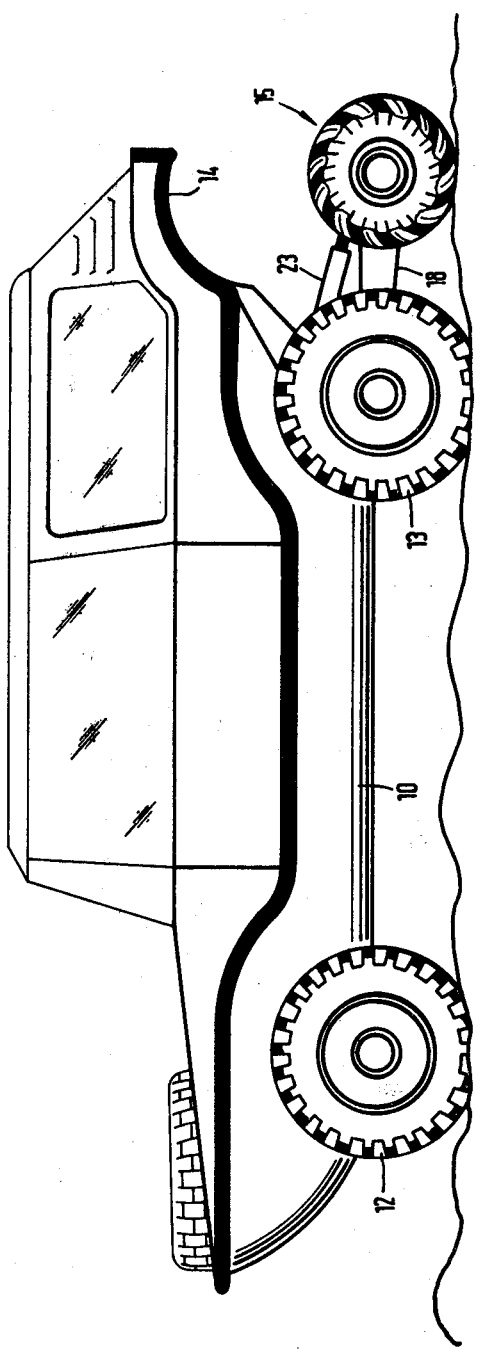
FIG. 4 is the vehicle in overland travel.

Practically, on each axle 20 are mounted two drive wheel sections 16, whereby the wheel pair 16a is powered independently from the wheel pair 16b (FIG. 5), through hydrostatic gearing shown generally at 25 and connected to wheels by hydraulic lines 26, which during overland travel corresponds to the position shown in FIG. 3 with the front wheel drive with regard to the different wheel diameters running synchronously.

Figure 2:
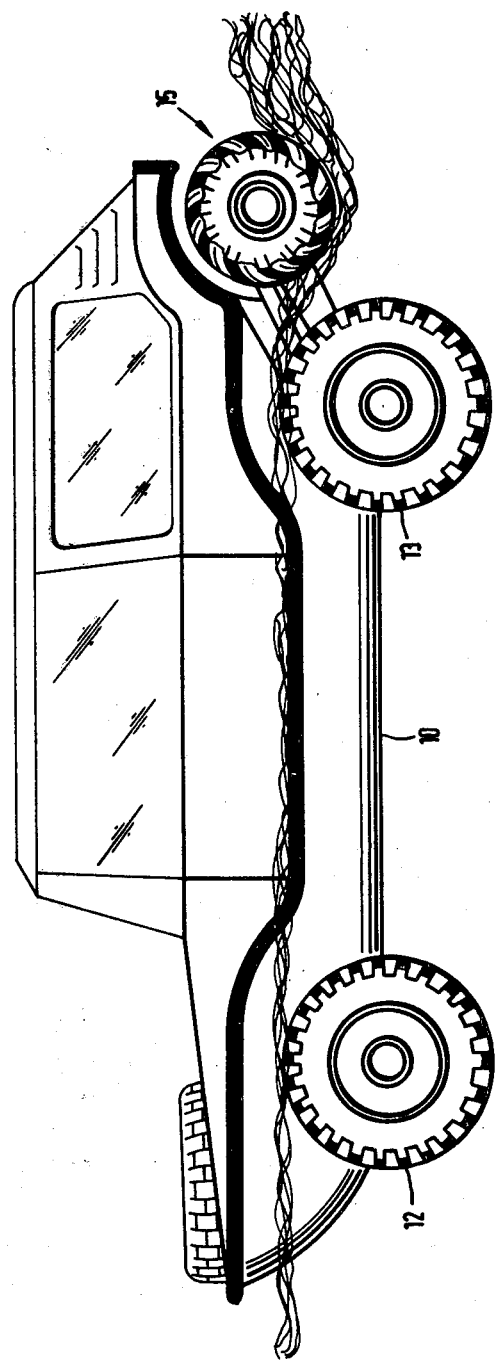
FIG. 2 is a vehicle as for drive while afloat.

In flotation performance, as in FIG. 2, pivot arms 18 are pivoted upward into a suitable position in which an optimum propulsion occurs. The best position for the propulsion occurs under consideration of the depth of submersion of the vehicle and also considering the speed of rotation or peripheral velocity of the drive wheels provided with rib profile 17. The maximum obtainable top end position is so determined that even with remarkably great depth of the floating vehicle, the depth of submersion of drive wheels 16 can be individually regulated. While the vehicle is afloat, there occurs a support of the steering gear of the vehicle through different depths of submersion of drive wheels 16a or 16b mounted on the wheel arms 18a or 18b, and/or through different rotation speed and/or direction of rotation.

With the object of this invention, a vehicle for conveyance of freight or passengers is provided which is suitable not only for rapid land travel and as determined for travel in water, but also can be effectively used to advantage in overland travel between solid ground and boggy ground, i.e. on swampy or boggy ground or an slopes of riverbanks or the like. Therefore, the drive wheels arrangement according to the invention allows advantageous additional possibilities of use, e.g. for special vehicles in ice or snow and for travel on mountainsides of all sorts.

The wheel which can be pivoted vertically and which has a strongly defined ribbing is especially suitable for the drive wheels arrangement. The drive wheel can be embodied in one unit or a plurality of units, and the wheels can be driven separately on one common axle or each section can be operated by itself, i.e. driven and also pivoted. The wheel or wheel pair can be raised and lowered with the aid of mechanical or hydraulic devices. Thus the vehicle can be raised by the drive wheel arrangement at the rear. On the other hand, the drive wheel can also be suspended and so pressed to the ground that it guarantees an optimum support and an effective propulsion.

The drive of the drive wheel occurs by mechanical or hydrostatic means and synchronously with the front wheel drive. When the vehicle is afloat, the drive of the drive wheels can be effected independently from the front wheel drive.

Individually, during land travel, the upward pivoted drive wheel of soft rubber or soft plastic in the form of air tires serves as a stabilizer. Drive of the front wheels suffices for land travel, if desired in the form of a hydrostatic individual wheel drive, in order to avoid breakthrough of the vehicle body embodied as floatation shell.

In land travel, the drive wheel drive is used in connection with the front wheel drive as four-wheel drive, and is used especially during climbing up slopes of riverbanks and swampy hillocks. The drive wheels arrangement is pressed against the ground by means of hydraulic cylinders. This compression pressure is regulated by a mechanical or pneumatic spring, and the irregularities of the ground are absorbed. In the water, the drive wheels arrangement is pivoted as in land travel into its topmost position for propulsion, and is driven with greater velocity, whereby the ribbing effects the propulsion as in the paddle principle. The drive motor can be brought to the most suitable positions for land and water travel by use of a hydrostatic control for the front wheels and the drive wheels arrangement, and thus the drive motor can be at the front, in the middle, or at the rear. The invention is not limited to the described embodiments.

What is claimed is:

1. A land vehicle comprising:
   an undercarriage having front and rear pairs of ground wheels, at least one of said pairs being driven,
   a vehicle body mounted on said undercarriage,
   auxiliary drive means comprising thrust roll means extended substantially across the width of the vehicle and being divided into two similar drive roll sections said auxiliary drive means being driveable independently of said at least one pair of driven ground wheels,
   each of said drive roll sections being rotatably mounted about a transverse axis with each section being secured to a separately controlled pivot arm pivotally mounted on said vehicle, the pivot arms being operable independently from one another so that one arm may pivot while the other arm remains stationary,
   said drive roll sections and said pivot arms being independently movable between a lower position wherein said drive roll sections are biased against the ground and an upper position wherein said sections are partially covered by said vehicle body and out of contact with the ground,
   said drive roll sections being of a rubber-like material and having a ribbed pattern thereon.

2. A vehicle as in claim 1 and wherein said drive roll sections each comprise a pair of secondary wheels.

3. A vehicle as in claim 2 and wherein each pair of secondary wheels is mounted on a common transverse axle supported on a single arm member.

4. A vehicle as in claim 3 wherein said pivot arms are height adjustable by means of hydraulic cylinders articulated to said undercarriage.

5. A vehicle as in claim 4 and wherein the degree of pressure of said drive roll sections against the ground is adjustable by means operating on said pivot arms.

6. A vehicle as in claim 1 and wherein one of said pairs of ground wheels is driven and said auxiliary drive means is synchronized with said one of said pairs of primary wheels.

7. A vehicle as in claim 1 and wherein said auxiliary drive means includes hydrostatic drive means.

8. A vehicle as in claim 1 and wherein said drive roll sections include circumferential and longitudinal ribs thereon.

9. A vehicle as in claim 1 and wherein said drive roll sections form a bumper when in said upper position.

10. A vehicle as in claim 1 and wherein:
    said undercarriage includes a watertight bottom shell.

* * * * *